United States Patent
Sato

(10) Patent No.: US 8,272,487 B2
(45) Date of Patent: Sep. 25, 2012

(54) ROTATION TRANSMISSION DEVICE

(75) Inventor: Koji Sato, Iwata (JP)

(73) Assignee: NTN Corporation, Osaka (JP)

(*) Notice: Subject to any disclaimer, the term of this patent is extended or adjusted under 35 U.S.C. 154(b) by 705 days.

(21) Appl. No.: 12/401,857

(22) Filed: Mar. 11, 2009

(65) Prior Publication Data
US 2009/0229945 A1 Sep. 17, 2009

(30) Foreign Application Priority Data

Mar. 12, 2008 (JP) .................................. 2008-062403

(51) Int. Cl.
*F16D 27/102* (2006.01)
(52) U.S. Cl. ........ 192/35; 192/38; 192/84.8; 192/110 B; 192/113.5; 384/480
(58) Field of Classification Search .................. 384/480; 192/35, 38, 84.8, 110 B, 113.5
See application file for complete search history.

(56) References Cited

U.S. PATENT DOCUMENTS

| | | | | |
|---|---|---|---|---|
| 1,722,490 A | * | 7/1929 | Bott et al. ..................... | 384/480 |
| 4,379,600 A | * | 4/1983 | Muller ........................... | 384/480 |
| 5,431,413 A | * | 7/1995 | Hajzler ......................... | 384/485 |
| 5,560,715 A | * | 10/1996 | Mosby ........................... | 384/477 |
| 6,102,575 A | * | 8/2000 | Obara ........................... | 384/480 |
| 6,599,020 B2 | * | 7/2003 | Obara ........................... | 384/480 |
| 6,769,524 B2 | * | 8/2004 | Yasui et al. ..................... | 192/44 |
| 7,278,938 B2 | * | 10/2007 | Ichihara et al. ................ | 192/45 |
| 2004/0175065 A1 | * | 9/2004 | Nguyen ........................ | 384/480 |
| 2006/0147141 A1 | * | 7/2006 | Harwood et al. ............. | 384/480 |

FOREIGN PATENT DOCUMENTS

JP 2007-247713 9/2007
* cited by examiner

*Primary Examiner* — David D Le
*Assistant Examiner* — Jacob S Scott
(74) *Attorney, Agent, or Firm* — Wenderoth, Lind & Ponack, LLP.

(57) ABSTRACT

A rotation transmission device has a housing having an end wall with a shaft hole. An input shaft is inserted through the shaft hole, and an inner ring is mounted around the end of the input shaft inside the housing. A two-way clutch is provided between the inner ring and an outer ring disposed around the inner ring, and an electromagnetic clutch is provided adjacently, controlling engagement and disengagement of the two-way clutch. A first bearing mounted between radially facing surfaces of the housing and the outer ring is an open bearing, provided with a labyrinth on its end near the side of the open end of the housing. A second, single-sealed bearing is provided between facing surfaces of the inner ring and the outer ring, supporting these rings rotatably relative to each other. Lubricating grease with the same quality is used for the second bearing and the two-way clutch.

4 Claims, 5 Drawing Sheets

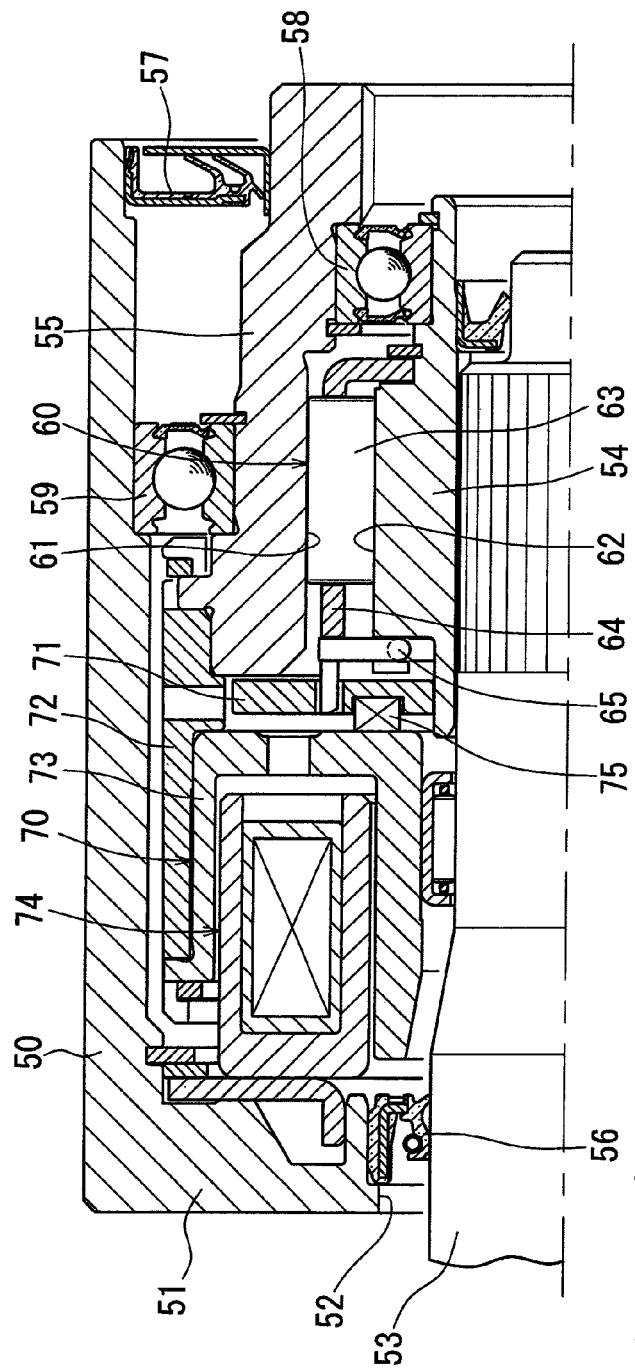
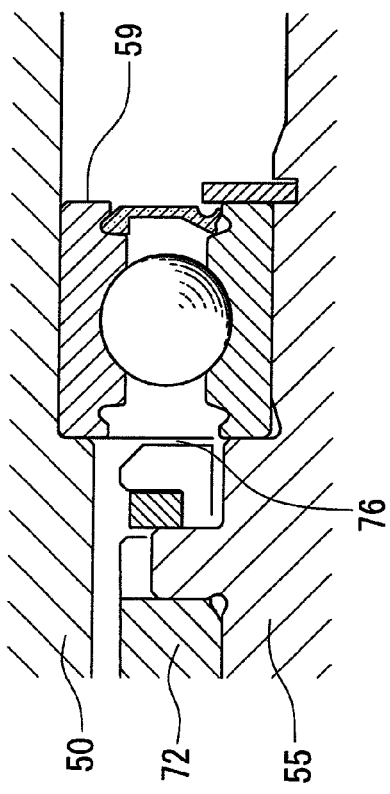
Prior Art  Fig.5A
Prior Art  Fig.5B

ROTATION TRANSMISSION DEVICE

BACKGROUND OF THE INVENTION

This invention relates to a rotation transmission device used for switching transmission and blocking of driving torque in a power transmission path.

The device disclosed in JP Patent Publication 2007-247713A is known as a device of this type. As shown in FIG. 5A, this rotation transmission device comprises a housing 50 having an end wall 51 in which a shaft hole 52 is formed, an input shaft 53 inserted through the shaft hole 52 into the housing 50, an inner ring 54 coupled to the end of the input shaft 53, an outer ring 55 provided around the inner ring 54, a two-way roller clutch 60 mounted between the inner ring 54 and the outer ring 55 for transmitting and blocking torque therebetween, and an electromagnetic clutch 70 provided adjacent to the two-way clutch 60 for controlling engagement/disengagement of the two-way roller clutch 60.

The two-way roller clutch 60 comprises cam surfaces 62 formed on the outer-diameter surface of the inner ring 54, defining wedge-shaped spaces between the respective cam surfaces 62 and a cylindrical surface 61 formed on the inner-diameter surface of the outer ring 55, rollers 63 mounted between the respective cam surface 62 and the cylindrical surface 61, a retainer 64 mounted between the inner ring 54 and the outer ring 55 for retaining the rollers 63, and a switch spring 65 biasing the retainer 64 to a neutral position, where the rollers 63 are disengaged from the cam surfaces 62 and the cylindrical surface 61.

The electromagnetic clutch 70 comprises an armature 71 which is rotationally fixed but axially movable relative to the retainer 64, a rotor guide 72 connected to the outer ring 55, a rotor 73 mounted in the rotor guide 72 and axially facing the armature 71, an electromagnet 74 axially facing the rotor 73, and a separation spring 75 biasing the armature 71 away from the rotor 73. When the electromagnet 74 is energized the armature 71 is attracted to and contacts the rotor 73. This causes the armature 71 to rotate relative to the inner ring 54 to thereby bring the rollers 63 into engagement with the cylindrical surface 61 and the cam surfaces 62.

In this rotation transmission device, a clearance between the inner-diameter surface of the shaft hole 52 and the outer-diameter surface of the input shaft 53 is sealed by a seal member 56 attached to the inner-diameter surface of the shaft hole 52, and a clearance between the end of the opening of the housing 50 and the outer-diameter surface of the outer ring 55 is sealed by a seal member 57 so that foreign material does not come into the housing 50.

The inner ring 54 and the outer ring 55 are supported so that they can rotate relative to each other by a bearing 58 fitted on the outer-diameter surface of the inner ring 54 at its end near the open end of the housing. The outer ring 55 is rotatably supported by a bearing 59 attached to the inner-diameter surface of the housing 50.

In the rotation transmission device disclosed in JP Patent Publication 2007-247713A, the bearing which supports the inner ring 54 and the outer ring 55 so that they can rotate relative to each other, and the two-way roller clutch 60 are lubricated with greases of different qualities. To prevent these greases from being mixed with each other and from being leaked out, the bearing 58 has two seals on both sides.

The bearing 59 supporting the outer ring 55 so as to be rotatable relative to the housing 50 is, as shown in FIG. 5B, mounted adjacent to the rotor guide 72. A labyrinth 76 is formed between the ends of the bearing 59 and the rotor guide 72. The labyrinth 76 prevents lubricating grease from leaking out from the inner end of the bearing 59. However, since there is no other means to prevent the grease from leaking out of the bearing 59 from the end near the opening of the housing, the bearing 59 has to have a seal on this side.

Thus in the conventional rotation transmission device, since the bearings 58 and 59 both have at least one seal, rotation resistance and energy loss are large, and the cost is high.

An object of this invention is to provide a rotation transmission device with smaller energy loss and lower cost.

SUMMARY OF THE INVENTION

The present invention provides a rotation transmission device comprising a cylindrical housing having one end closed with a wall formed with a shaft hole, a torque transmission shaft inserted through the shaft hole into the housing, an inner ring coupled to an end of the torque transmission shaft, an outer ring provided around the inner ring, a first bearing fitted to an inner-diameter surface of the housing and rotatably supporting the outer ring, a second bearing fitted to an outer-diameter surface of the inner ring at an open end of the housing, and supporting the inner ring and the outer ring so as to be rotatable relative to each other;

a two-way clutch provided between the inner ring and the outer ring for transmitting and blocking rotation torque therebetween, an electromagnetic clutch provided adjacent to the two-way clutch for controlling engagement and disengagement of the two-way clutch, a first seal member sealing a clearance between an inner-diameter surface of the shaft hole and an outer-diameter surface of the torque transmission shaft, and a second seal member sealing a clearance between an inner-diameter surface of the open end of the housing and an outer-diameter surface of the outer ring, wherein lubricating grease of the same quality is used for the second bearing and the two-way clutch, and wherein the second bearing has first and second sides and includes a seal member on the first side and includes no seal member on the second side, the second bearing being mounted with second side facing the two-way clutch.

As described above, by using grease of the same quality for the bearing rotatively supporting the inner and outer rings relative to each other and the two-way clutch, a single-sealed bearing can be adopted for the above-mentioned bearing. This can reduce the rotation resistance during idling of the inner ring, and can subsequently reduce energy loss and cost.

The bearing attached to the inner-diameter surface of the housing to support the outer ring may be an open type bearing having no seals, and including a labyrinth provided on one side thereof facing the open end of the housing to prevent lubricating grease from leaking out. Since the labyrinth prevents the grease from leaking out, the bearing may be an open-type, which can reduce resistance during rotation transmission from the inner ring to the outer ring and thus can reduce the cost.

For the rotation transmission device with the open-type bearing described above, a pair of snap rings with different diameters may be attached, respectively, to the inner-diameter surface of the housing and to the outer-diameter surface of the outer ring so that the snap rings radially face each other, defining a clearance between the snap rings as a labyrinth. Since these snap rings position the bearing and at the same time form the labyrinth, a separate labyrinth member is not needed and thus the cost is reduced.

In the rotation transmission device according to the present invention, the single-sealed bearing supporting the inner ring and the outer ring rotatably relative to each other and the open bearing supporting the outer ring may be deep groove ball bearings. This can further reduce rotation resistance since rotation resistance in a deep groove ball bearing is lower than those of the other types of bearings.

As described above, this invention uses the same grease for the bearing supporting the inner and outer rings rotatably relative to each other and the two-way clutch, and a single-sealed type bearing can be adopted for the above-mentioned bearing. This reduces rotation resistance during idling of the inner ring, and thus makes it possible to provide a rotation transmission device with smaller energy loss and lower cost.

BRIEF DESCRIPTION OF THE DRAWINGS

Other features and objects of the present invention will become apparent from the following description made with reference to the accompanying drawings, in which:

FIG. 5A is a sectional view of a conventional rotation transmission device; and

FIG. 5B is an enlarged sectional view of the support of the outer ring in FIG. 5A.

DETAILED DESCRIPTION OF THE PREFERRED EMBODIMENTS

Figure 1:
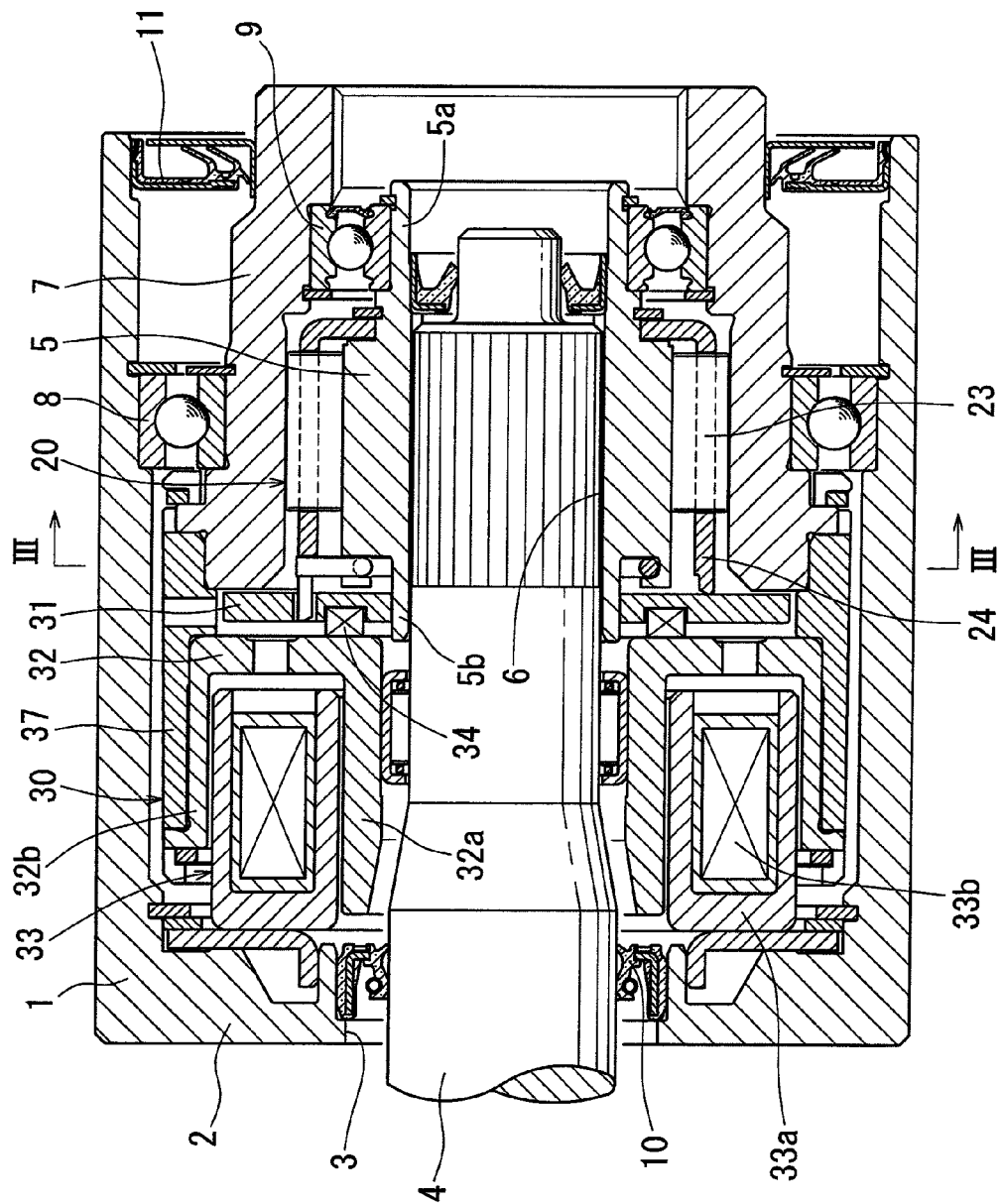
FIG. 1 is a sectional front view of a rotation transmission device embodying this invention.

The rotation transmission device embodying this invention is now described with reference to the drawings. As shown in FIG. 1, the rotation transmission device includes a cylindrical housing 1 having an end wall 2, and an input shaft 4 as a torque transmission shaft inserted in a shaft hole 3 formed in the end wall 2.

An inner ring 5 is fitted around the end of the input shaft 4 which is located inside the housing 1 through serrations 6 so that the input shaft 4 cannot rotate relative to the inner ring 5. An outer ring 7 is mounted around the inner ring 5 and rotatably supported by a bearing 8 fitted on the inner-diameter surface of the housing 1.

The inner ring 5 has small-diameter shaft portions 5a and 5b at both ends. A bearing 9 is mounted on the small-diameter shaft portion 5a at the open end of the housing, supporting the inner ring 5 and the outer ring 7 so that they can rotate relative to each other.

The clearance between the inner-diameter surface of the shaft hole 3 and the input shaft 4 is sealed by a seal member 10. The clearance between the inner-diameter surface of the open end of the housing 1 and the outer ring 7 is sealed by a seal member 11.

A two-way clutch 20 is provided between the inner ring 5 and the outer ring 7. An electromagnetic clutch 30 is mounted adjacent to the two-way clutch 20 to control engagement/disengagement of the two-way clutch 20.

Figure 2:
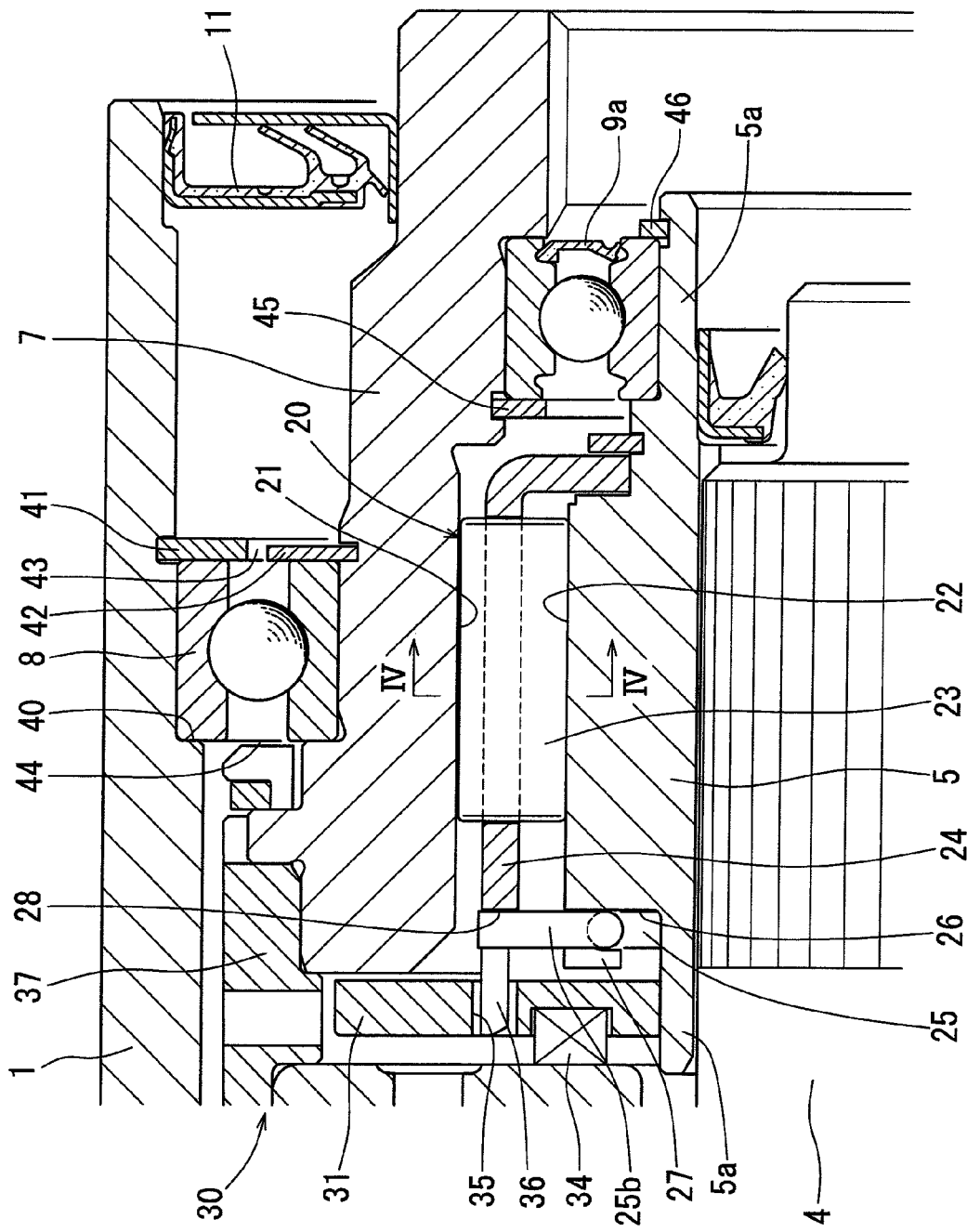
FIG. 2 is a partial enlarged sectional view of the rotation transmission device of FIG. 1, showing how an outer ring is mounted.
Figure 4A:
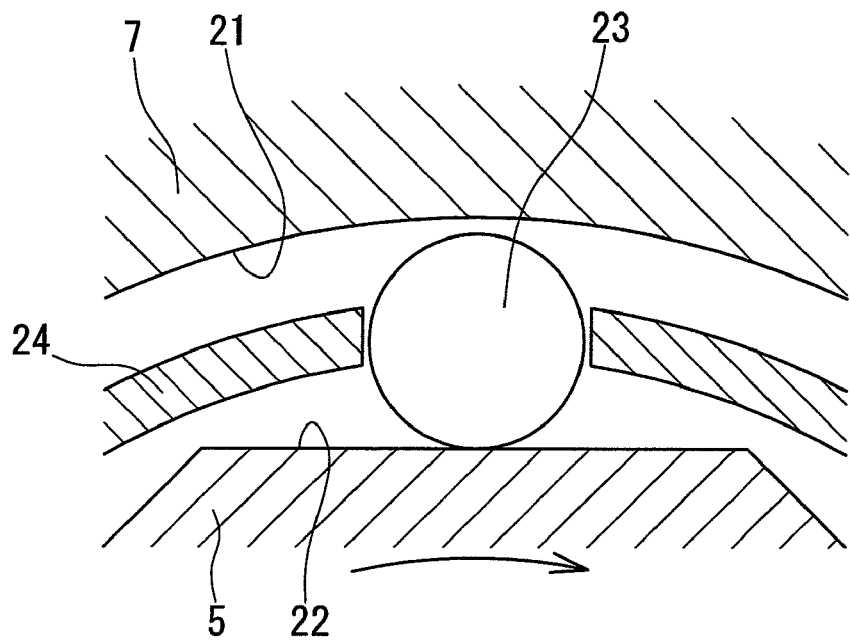
FIG. 4A is a sectional view taken along the line IV-IV of FIG. 2.

As shown in FIGS. 2 and 4A, the two-way clutch 20 comprises a cylindrical surface 21 formed on the inner-diameter surface of the outer ring 7, a plurality of cam surfaces 22 provided at regular intervals in the circumferential direction on the outer surface of the inner ring 5 and defining wedge-shaped spaces in cooperation with the cylindrical surface 21, rollers 23 as engaging elements mounted between the respective cam surfaces 22 and the cylindrical surface 21, and a retainer 24 mounted between the inner ring 5 and the outer ring 7, retaining the rollers 23.

Figure 3:
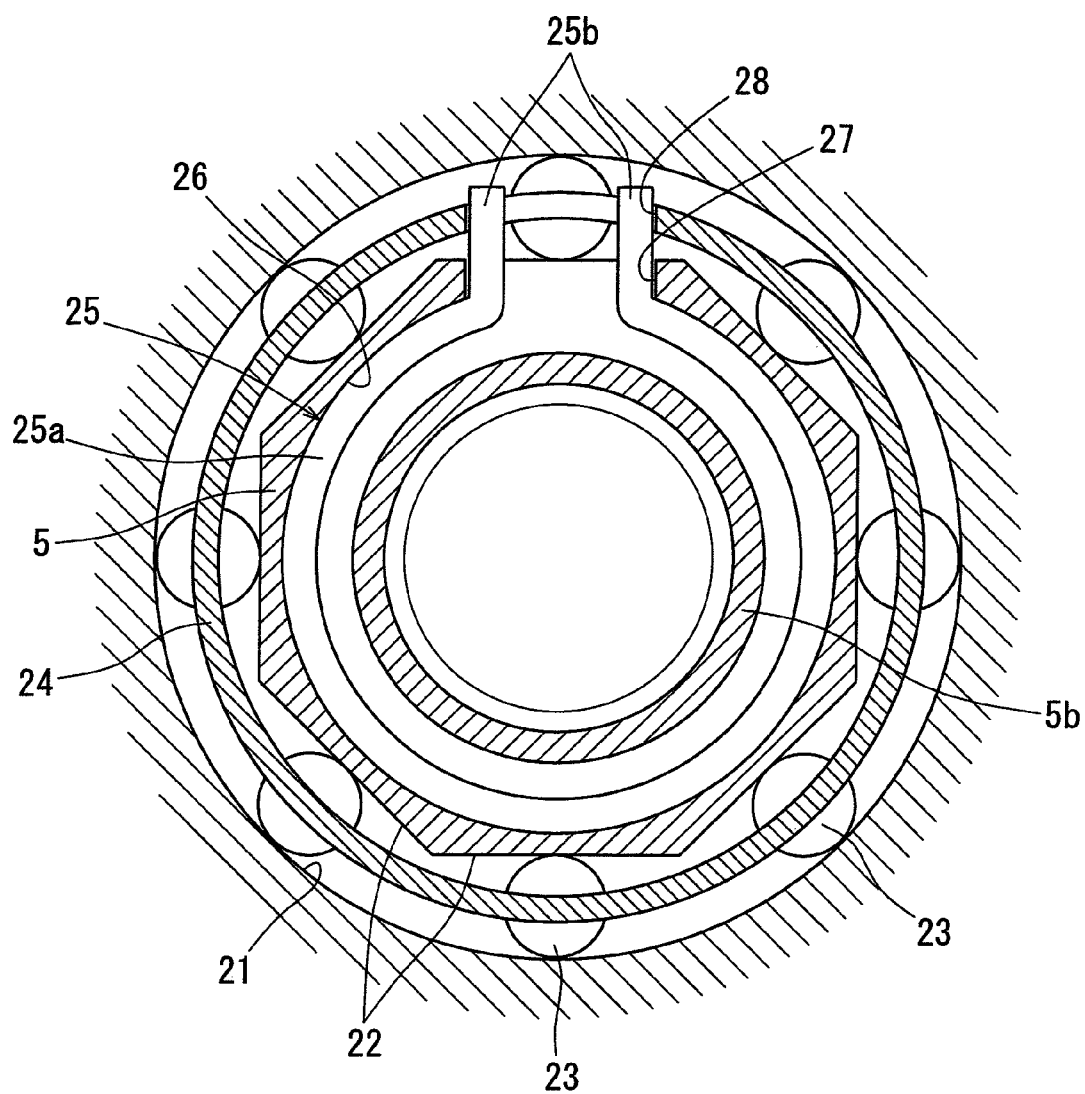
FIG. 3 is a sectional view taken along the line III-III of FIG. 1.

As shown in FIGS. 2 and 3, a switch spring 25 is mounted between the inner ring 5 and the retainer 24 to bias the retainer 24 to a neutral position, where the rollers 23 are not engaged with the cylindrical surface 21 and the cam surfaces 22.

The switch spring 25 has a C-shaped ring portion 25a and a pair of pushing pieces 25b, protruding outwardly from the ends of the ring portion 25a.

The ring portion 25a of the switch spring 25 is mounted in a spring receiving recess 26 formed in the end face of the inner ring 5. The pair of pushing pieces 25b are inserted in a cutout 27 formed in the peripheral wall of the spring receiving recess 26 and a cutout 28 formed in the end face of the retainer 24, biasing the circumferentially opposed end walls of the respective cutouts 27 and 28 away from each other, thereby biasing the retainer 24 and thus the rollers 23 to the neutral position.

As shown in FIG. 1, the electromagnetic clutch 30 comprises an armature 31 slidably mounted around the small-diameter shaft portion 5b of the inner ring 5 and axially facing the end face of the retainer 24, a rotor 32 axially facing the armature 31, an electromagnet 33 axially facing the rotor 32, and a separation spring 34 that biases the armature 31 in a direction away from the rotor 32.

As shown in FIG. 2, an engaging hole 35 is formed in the armature 31, in which a protrusion 36 provided on the end face of the retainer 24 is inserted. The armature 31 is thus kept nonrotatable relative to the retainer 24, but movable in the axial direction.

As shown in FIG. 1, the rotor 32 comprises radially inner and outer cylindrical portions 32a and 32b. The radially outer cylindrical portion 32b is pressed into a rotor guide 37 comprising a non-magnetic material and mounted to the open end of the outer ring 7 so that the rotor 32 does not rotate relative to the outer ring 7.

The electromagnet 33 comprises a core 33a and an electromagnetic coil 33b supported by the core 33a. The electromagnet 33 is provided between the inner cylindrical portion 32a and the outer cylindrical portion 32b of the rotor 32, the core 33a being nonrotatably supported by the closed end of the housing 1.

As shown in FIG. 2, the bearing 8, fitted to the inner-diameter surface of the housing 1 and rotatably supporting the outer ring 7, comprises an open-type deep groove ball bearing. The bearing 8 is axially positioned by a shoulder 40 formed on the inner-diameter surface of the housing 1 and a pair of snap rings 41 and 42 having different diameters from each other and attached respectively to the inner-diameter surface of the housing 1 and the outer-diameter surface of the outer ring 7.

The pair of snap rings 41, 42 radially face each other to define a labyrinth 43 between the inner-diameter surface of the outer snap ring 41 and the outer-diameter surface of the inner snap ring 42, preventing lubricating grease in the bearing 8 from leaking out.

Also, a labyrinth 44 is defined between the portions of the bearing 8 and the rotor guide 37 that face each other, preventing lubricating grease in the bearing 8 from leaking out.

The bearing 9, which is mounted around the small-diameter shaft portion 5a of the inner ring 5, is lubricated with grease sealed inside. This lubricating grease is the same grease as that lubricating the two-way clutch 20.

The bearing 9 comprises a deep groove ball bearing having a seal 9a mounted at its one end only, i.e. the end near the opening of the housing 1. The bearing 9 is axially positioned by a snap ring 45 attached on the inner-diameter surface of the outer ring 7 and a snap ring 46 attached on the outer-diameter surface of the small-diameter shaft portion 5a of the inner ring 5.

While the coil 33b of the electromagnet 33 is not energized, the rollers 23 are kept in the neutral position shown in FIG. 4A by the force of the switch spring 25. In this state, rotation of the input shaft 4 is not transmitted to the outer ring 7.

With the input shaft 4 rotating, when the coil 33b of the electromagnet 33 is energized, the armature 31 is magnetically attracted toward the electromagnet 33 against the force of the separation spring 34 and contacts the rotor 32.

Figure 4B:
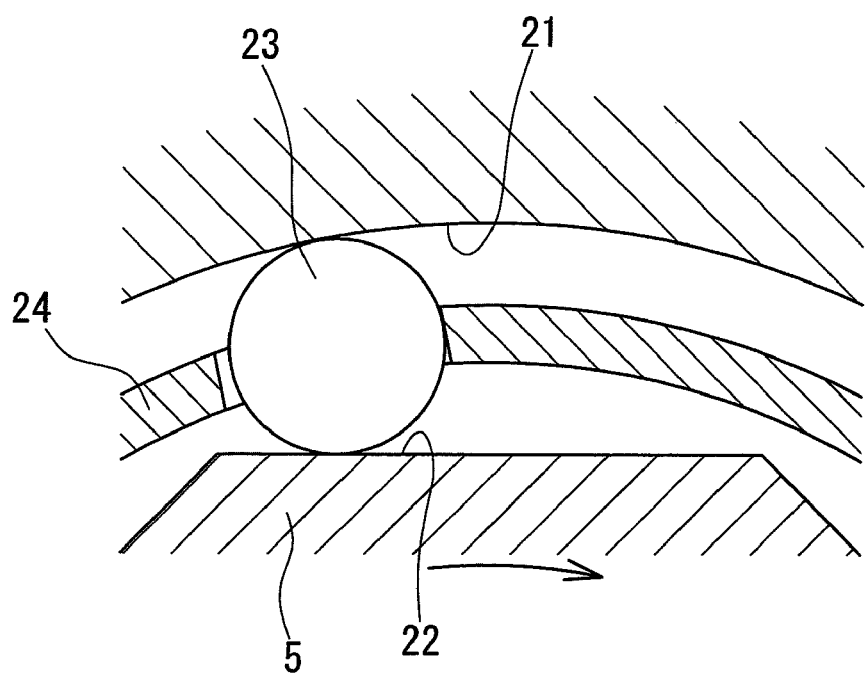
FIG. 4B is a sectional view of a two-way clutch when in engagement.

Frictional resistance between the surfaces of the rotor 32 and the armature 31 when they contact becomes the rotational resistance of the retainer 24. Since this friction resistance is set to be larger than the spring force of the switch spring 25, the switch spring 25 elastically deforms and the input shaft 4 rotates relative to the retainer 24 to the position of FIG. 4B, where each roller 23 is pushed to the narrower side of the wedge-shaped space and the roller 23 engages with the cylindrical surface 21 and the cam surface 22. Rotation of the input shaft 4 is thus transmitted to the outer ring 7 through the rollers 23.

When the coil 33b is de-energized in this state, the armature 31 moves away from the rotor 32 by the pushing force of the separation spring 34.

When the armature 31 moves away from the rotor 32, by the spring force of the switch spring 25, the retainer 24 rotates relative to the input shaft 4 in the opposite direction to that during the engagement of the rollers 23. The rollers 23 are now disengaged from the cylindrical surface 21 and the cam surfaces 22, returning to the neutral position as shown in FIG. 4A. Rotation transmission from the input shaft 4 to the outer ring 7 is thus blocked, and the input shaft 4 and the inner ring 5 rotate freely.

The bearing 9 is a single-sealed deep groove ball bearing having a seal only on one side thereof. Thus, the bearing 9 can rotate with smaller rotation resistance compared to a double-sealed deep groove ball bearing. The inner ring 5 thus idles smoothly relative to the outer ring 7 when the clutch is not engaged, thus minimizing energy loss. Also, since lubricating grease in the bearing 9 is prevented from leaking outside the bearing by the seal 9a, the life of the bearing 9 is not decreased by exhaustion of lubricating grease.

The bearing 8 is an open type deep groove ball bearing (i.e. bearing with no seals). Thus, the bearing 8 can rotate with smaller resistance than that of a sealed deep groove ball bearing. The outer ring 7 can therefore rotate smoothly by torque transmitted through the rollers 23 when the clutch is in engagement, and thus its energy loss is small. Also, since lubricating grease in the bearing 8 is prevented from leaking outside the bearing by the labyrinth 43 defined between the facing snap rings 41, 42 and by the labyrinth 44 formed on the end surface facing to the rotor guide 37, the life of the bearing 8 is not decreased by exhaustion of lubricating grease.

What is claimed is:

1. A rotation transmission device comprising:
   a cylindrical housing having a first end closed with a wall formed with a shaft hole, and a second end constituting an open end;
   a torque transmission shaft inserted through said shaft hole into said housing;
   an inner ring coupled to an end of said torque transmission shaft;
   an outer ring provided around said inner ring;
   a first bearing fitted to an inner-diameter surface of said housing and rotatably supporting said outer ring;
   a second bearing fitted to an outer-diameter surface of said inner ring at the open end of said housing, and supporting said inner ring and said outer ring so as to be rotatable relative to each other;
   a two-way clutch provided between said inner ring and said outer ring for transmitting and blocking rotation torque therebetween;
   an electromagnetic clutch provided adjacent to said two-way clutch for controlling engagement and disengagement of said two-way clutch;
   a first seal member sealing a clearance between an inner-diameter surface of said shaft hole and an outer-diameter surface of said torque transmission shaft; and
   a second seal member sealing a clearance between an inner-diameter surface of said open end of said housing and an outer-diameter surface of said outer ring;
   wherein lubricating grease of the same quality is used for said second bearing and said two-way clutch, and wherein said second bearing has first and second sides and includes a seal member on said first side and includes no seal member on said second side, said second bearing being mounted with said second side facing said two-way clutch; and
   wherein said first bearing is an open type bearing having no seals, and including a labyrinth provided on one side thereof facing the open end of said housing to prevent lubricating grease from leaking out; and
   wherein a pair of snap rings with different diameters are attached, respectively, to the inner-diameter surface of said housing and to the outer-diameter surface of said outer ring so that said snap rings radially face each other, defining a clearance between said snap rings as said labyrinth.

2. The rotation transmission device of claim 1 wherein said second bearing comprises a deep groove ball bearing.

3. The rotation transmission device of claim 1 wherein said first bearing is a deep groove ball bearing.

4. The rotation transmission device of claim 1 wherein said two-way clutch is a two-way roller clutch.

* * * * *